United States Patent Office 3,253,979
Patented May 31, 1966

3,253,979
LIGHT STABILIZED CHLORINE COMPOSITIONS
Homer L. Robson, New Haven, Conn., assignor to Olin Mathieson Chemical Corporation, a corporation of Virginia
No Drawing. Filed June 20, 1963, Ser. No. 289,388
4 Claims. (Cl. 167—17)

This invention relates to a new and effective treatment for the sanitation of swimming pool water. The method consists of stabilizing free available chlorine against the decomposing action of sunlight by adding to the pool water a substance which absorbs radiation having wavelengths between 3000 and 4000 Angstrom units.

Free available chlorine, which is appropriately introduced into aqueous bodies by means of liquid or gaseous chlorine or hypochlorites, is the form of available chlorine most effective in sanitizing. Combined available chlorine in the simple chloramines, $NH_2Cl$ and $NHCl_2$ are much less effective but are used as sanitizing agents. Monochloramine is stable to sunlight but dichloramine is not. The more complex chloramines such as the N-dichlorodimethylhydantoins, N-chlorisocyanurates and the N-chlorosulfamates are of intermediate effectiveness, through more stable than free chlorine.

Free available chlorine removes ammonia from pool water by reacting with it to form monochloramine, $NH_2Cl$ and with other nitrogenous materials to form other chloramines. Dichloramine and nitrogen trichloride are formed mostly at pH levels lower than usually recommended for swimming pools, for example, pH 4.5 to 7.0. These materials are irritating to the eyes and mucous membranes of swimmers. A pH level is usually picked which largely eliminates the dichloramine. pH levels of 7.4 to 7.6 are commonly recommended, and levels of 7.4 to 8.4 are used by nearly all pools. The higher pH levels are generally found more comfortable and gentler on eyes, although more available chlorine is required with them.

In public swimming pools, the high bather load consumes most of the available chlorine. In private pools and in semi-private pools, such as those associated with motels, the bather load is commonly light and the free available chlorine is principally lost by the action of sunlight. This action is so severe on sunny days that the available chlorine, normally carried in sufficient excess, is reduced to ineffective levels in as little as six hours. This loss is normally several times the loss caused by the bather load on the pool. It occurs even when the pool is not used. This loss of free available chlorine is an inconvenience and a serious expense because available chlorine must be added to compensate for that destroyed by sunlight. Frequently, this amount is impossible to estimate, not knowing the hours or intensity of the sunshine. Extra tests have to be run to determine the remaining available chlorine in the pool, and the correct additional amount to be added to bring the chlorine protection to an adequate level.

Stabilizers have been added to avoid the greater part of the losses of available chlorine due to sunlight falling on the pool. Cyanuric acid and sulfamic acid are two of these which have become popular. These reduce the loss due to sunshine to a minor factor in comparison with the loss of available chlorine due to the bather load.

When cyanuric acid is added to a swimming pool, it quickly reacts with the free available chlorine to form N-chloroisocyanuric acid or its salts, the N-chloroisocyanurates. These N-chloro compounds do not absorb in the ultraviolet region of sunlight and thus are not decomposed by sunlight. When sulfamic acid is added to the pool, N-chloro sulfamates are formed. These have a much smaller absorption of ultraviolet light from sunlight than free hypochlorite has and hence reduce, but do not eliminate, the loss of available chlorine by sunlight. With either, some hypochlorite remains in the pool, the amount depending on the concentration of the available chlorine present, the pH of the solution and the concentration of the stabilizer. Normally concentrations of around 40 parts per million of cyanuric acid or of sulfamic acid are recommended, and these are quite effective in stabilizing the 0.5 to 2 p.p.m. of available chlorine carried in the pool from the effects of sunlight.

The N-chloroisocyanurates and the N-chlorosulfamates are both less effective bactericides than the same amount of free available chlorine. As a substantial margin of available above the minimum required for bactericidal action is normally carried in swimming pools, this factor is seldom a serious one, and it is compensated by carrying increased levels of available chlorine. However, control of algae in swimming pools requires still higher levels. Thus, at pH 7.5, about 0.6 p.p.m. of free available chlorine is required to repress completely the growth of algae. In pools stabilized with cyanuric acid, from 1.0 to 1.2 parts per million of available chlorine are required to give equal control. With sulfamic acid as the stabilizer, 2 to 4 parts per million of available chlorine are required. These substantially increased amounts of available chlorine are not an economic hardship in most instances. However, an insufficiently increased level of available chlorine results in increased algae growths. This difficulty increases with the amount of stabilizers added to the pool.

Another difficulty arises in keeping the pool water as clean and pure as possible when the previously known stabilizers are used. In ordinary bathing, certain contaminants are brought into the water in addition to bacterial infection. Perspiration, urea, hair treatment materials, powders and lotions are brought in by bathers. Insects, leaves and dust are blown in by the wind. This results in an undesirable content of ammonia and of other nitrogenous materials. In addition, the water supplies employed to fill many pools initially contain substantial amounts of ammonia and of albuminoid or other nitrogenous material. Treatment of the pool water with free available chlorine controls the content of such materials as ammonia and urea. By periodically treating the pool to "break point chlorination" or "slugging," these compounds may be largely eliminated from the pool. In these treatments, from 8 to 15 parts per million of free available chlorine is added to the pool preferably in the evening. This large excess reacts with the nitrogen bearing materials, largely converting them to gaseous nitrogen or to nitrates.

If stabilizers have been added to the pool, this break point chlorination treatment is much less effective than in the absence of these known stabilizers. Substantial amounts of nitrogenous material may remain in the pool. If the available chlorine is these pools is deficient, algae growth may quickly become serious, as the nitrogenous matter in the pool water provides food for the algae. Further, removal of the algae by adding increased amounts of available chlorine is somewhat ineffective, as the N-chloro compounds are not as powerful oxidizing agents as free available chlorine.

As a result of these factors, the cleanest water, most free from algae, is found in pools protected with free available chlorine avoiding known stabilizers. However, this requires larger amounts of chlorine or hypochlorite to replace sunlight losses than are needed in stabilized pools.

According to the present invention, the introduction of suitable light screening agents to the swimming pool water greatly reduces the loss of free available chlorine by sunlight. This avoids the necessity for stabilizers of available chlorine, permits the use of free available chlorine, more effective in sanitizing and controlling algae and reduces materially losses due to sunlight. A preferred example of suitable compounds is ethyl alpha-cyano-beta, beta-diphenylacrylate. The addition of 1 to 10 p.p.m., preferably about 3 to 8 p.p.m. of this material to a swimming pool reduces the destruction of free available chlorine by sunlight to about one fourth of that found in the absence of the light screening agent.

Suitable light screening agents absorb ultraviolet radiation having wave lengths between 3000 and 4000 Angstrom units. They may absorb other radiation as well and they do not necessarily absorb all radiation within the stated range to be useful. Suitable absorbents also are resistant to free available chlorine. Most effective and stable of the known absorbents are alpha-cyano-arylacrylates and cinnamates of the formula $$A_2C{:}C(CN)CO_2R$$

in which A is selected from the group consisting of hydrogen and aryl radicals containing substituents resistant to the action of free available chlorine, at least one A being said aryl radical and R is selected from the group consisting of hydrogen, lower alkyl radicals having one to five carbon atoms and one equivalent of sodium, potassium, calcium and magnesium. The aryl radicals can be mono or polynuclear including phenyl, naphthyl, phenanthryl. If substituted, the aryl radicals preferably contain substituents resistant to the action of free available chlorine including, bromo, chloro, iodo, fluoro, sulfonic acid, lower alkyl, lower alkoxy and acyl radicals. Examples include:

Alpha-cyano-beta, beta-diphenyl acrylic acid
Alpha-cyano-beta, beta-diphenyl acrylic acid methyl ester
Alpha-cyano-beta, beta-diphenyl acrylic acid ethyl ester
Alpha-cyano-beta, beta-diphenyl acrylic acid i-propyl ester
Alpha-cyano-beta, beta-diphenyl acrylic acid n-butyl ester
Alpha-cyano-beta, beta-diphenyl acrylic acid i-amyl ester
Alpha-cyano-beta, beta-diphenyl acrylic acid sodium salt
Alpha-cyano-beta, beta-diphenyl acrylic acid potassium salt
Alpha-cyano-beta, beta-diphenyl acrylic acid calcium salt
Alpha-cyano-beta, beta-diphenyl acrylic acid magnesium salt
Alpha-cyano-beta, beta-di-o-methoxyphenylacrylic acid ethyl ester
Alpha-cyano-beta, beta-di-p-chlorophenylacrylic acid sodium salt
Alpha-cyano-beta, beta-di-p-tolylacrylic acid
Alpha-cyano-beta, beta-di-o-benzoylphenylacrylic acid
Alpha-cyano-beta, beta-di-m-sulfophenylacrylic acid sodium salt
Alpha-cyano-beta, beta-di-o-ethoxyphenylacrylic acid ethyl ester
Alpha-cyano-beta, beta-di-p-acetylphenylacrylic acid ethyl ester
Alpha-cyano-beta, beta-di-beta-naphthylacrylic acid calcium salt
Alpha-cyano-cinnamic acid sodium salt Also suitable but less desirable are certain phenolic light screening agents which are moderately resistant to the action of free available chlorine. Among these are aryl salicylates and hydroxybenzophenones. Examples include:

Phenyl salicylate
p-Tert.-butylphenyl salicylate
5-chloro-2-hydroxybenzophenone
Alpha-cyano-p-coumaric acid methyl ether Preferably the light screening agents have no objectionable odors, tastes or toxicity. Highly colored materials which impart color to the pool water are to be avoided. Ethyl alpha-cyano-beta, beta-diphenylacrylate has a high $LD_{50}$ of 16 grams per kilogram of body weight, providing a safety margin of some ten thousand fold per quart of swallowed water. This far exceeds the 100-fold safety factor on toxicity normally required for swimming pools and similar uses. Several of the other substituted acrylates have similar low toxicities and no or negligible taste effects.

The light screening agents which are normally considered insoluble in water are usually soluble to the extent of the few parts per million used according to the present invention. They may be added directly to the pool water in the appropriate dosage. A solid body of the light screening agent may be placed in the skimmer where it slowly dissolves in suitable amounts. These stabilizers may also be dissolved and metered by pump or dripped into the water. Water-miscible solvents, including the lower alcohols can be used, for example, ethyl alcohol and tertiary butyl alcohol. Even though such solutions produce a milky cloud on addition to water, the proper proportions readily dissolve in larger quantities of the water passing through the circulating pump. The primary and secondary alcohols do react with available chlorine but at allowable rates considering the minor amounts used. The tertiary lower alcohols, butyl and amyl particularly, react to a degree with available chlorine to form tertiary alkyl hypochlorites in which, however, the chlorine remains available, though not free available chlorine.

The preferred screening agents, resistant to the action of available chlorine need be introduced into the pool water once at the beginning of each season and have a normal useful life of an entire season. Others may require replenishing monthly depending largely on losses and degree of resistance to available chlorine.

The water used to fill swimming and wading pools is usually municipally or privately treated in various ways and contains dissolved salts, gases and, sometimes, contaminants. It may however, be raw, untreated water. It may come from oceans, rivers, lakes or underground or other sources. In the present specification and claims, this ordinary water is meant by the term, water.

*Example I*

The water in a 20,000 gallon swimming pool was circulated by means of a pump through a calcium hypochlorite tablet feeder and returned to the pool to maintain a free available chlorine content in the water of 1 p.p.m. The pool was exposed to bright sunlight nearly every day at air temperatures of 80° to 100° F. During one month of normal use, five pounds of calcium hypochlorite tablets were consumed.

A one pound block of ethyl alpha-cyano-beta, beta-diphenyl acrylate was placed in the skimmer of the above pool where the pump intake drew water over the block until it dissolved to form a solution of 6 p.p.m. in the pool water. During a month of operation of the pool under substantially the same conditions of temperature, bather load and other factors, only 3.8 pounds of calcium hypochlorite tablets were required to maintain the free available chlorine in the pool water at 1 p.p.m.

What is claimed is:

1. An aqueous composition of matter consisting of (1) water, (2) from 0.1 to 10 parts per million of free available chlorine and (3) from 1 to 10 parts per million of a light screening agent having the formula $$A_2C{:}C(CN)CO_2R$$

in which A is selected from the class consisting of hydrogen and aryl, at least one A is said aryl and said aryl is selected from the group consisting of phenyl, naphthyl, phenanthryl and said phenyl, naphthyl and phenanthryl substituted by a member selected from the group consisting of bromo, chloro, iodo, fluoro, sulfonic acid, lower alkyl, lower alkoxy, and benzoyl and acetyl; and R is selected from the group consisting of hydrogen, lower alkyl of one to five carbons, and one equivalent of sodium, potassium, calcium and magnesium.

2. A composition of claim 1 in which the said light screening agent is alpha-cyano-beta, beta-diphenyl acrylic acid.

3. A composition of claim 1 in which the said light screening agent is ethyl alpha-cyano-beta, beta-diphenyl acrylate.

4. A composition of claim 1 in which the said light screening agent is calcium alpha-cyano-beta, beta-diphenyl acrylate.

References Cited by the Examiner

UNITED STATES PATENTS

| 2,435,005 | 1/1948 | Huppke et al. | 167—90 |
| 2,988,471 | 6/1961 | Fuchs et al. | 167—17 |
| 3,085,097 | 4/1963 | Strobel et al. | 260—465 |

FOREIGN PATENTS

| 877,407 | 9/1961 | Great Britain. |

OTHER REFERENCES

Chemical Abstracts, vol. 44, p. 5535e (1950).
Chemical Abstracts, vol. 48, p. 1956a (1954).
Chemical Abstracts, vol. 56, p. 7208 (1962).
Signore et al., Journal of the Society of Cosmetic Chemists, vol. 9, No. 6, Nov. 1958, pp. 358–359.

JULIAN S. LEVITT, *Primary Examiner*.